United States Patent

[11] 3,556,441

[72] Inventor Julius J. Oberlander
    2148 W. 12th Ave., Gary, Ind. 46404
[21] Appl. No. 764,880
[22] Filed Oct. 3, 1968
[45] Patented Jan. 19, 1971

[54] MULTILEVEL AIRPORT STRUCTURE
    13 Claims, 5 Drawing Figs.

[52] U.S. Cl. .................................................... 244/114
[51] Int. Cl. ..................................................... B64f 1/36
[50] Field of Search ......................................... 244/114,
    63, 43.5; 114/43.5

[56] References Cited
    UNITED STATES PATENTS

| | | | |
|---|---|---|---|
| 1,709,069 | 4/1929 | Fox | 244/114 |
| 1,753,574 | 4/1930 | Loth | 244/114 |
| 1,814,985 | 7/1931 | Florido | 244/114 |
| 1,843,640 | 2/1932 | Jackson et al. | 244/114 |
| 2,399,461 | 4/1946 | Brown | 244/114X |
| 3,033,499 | 5/1962 | Ash | 244/114 |
| 1,896,546 | 2/1933 | Kulik | 244/63UX |

OTHER REFERENCES

Aero Digest. " Hangar Roof Runway Terminal Airport."
May 1, 1944, pages 56—58

Science and Invention. " Air Transportation Station of 1950." January 1926, page 796.

Primary Examiner—Milton Buchler
Assistant Examiner—Paul E. Sauberer
Attorney—Hofgren, Wegner, Allen, Stellman & McCord ABSTRACT: This invention concerns a multilevel airport building structure providing aircraft landing and takeoff and passenger and cargo movement facilities within a single building. The structure includes a landing strip on the roof where incoming planes come in for a landing, an aircraft and passenger service area on the intermediate level where the aircraft is fueled, checked, and passengers board and depart, a takeoff strip on a lower level where the aircraft taxies and takes off, and an aircraft elevator for moving the aircraft vertically between the different levels.

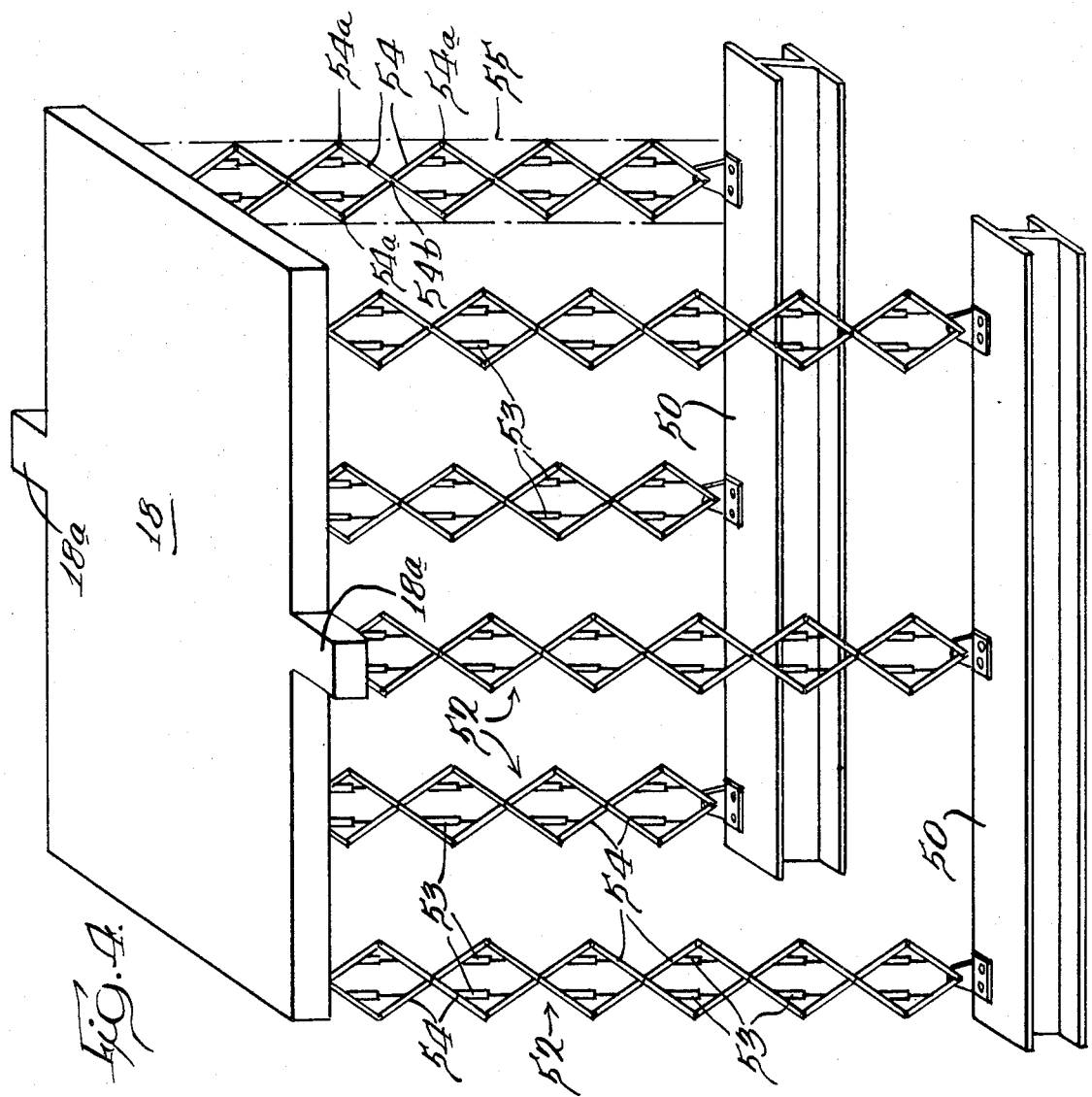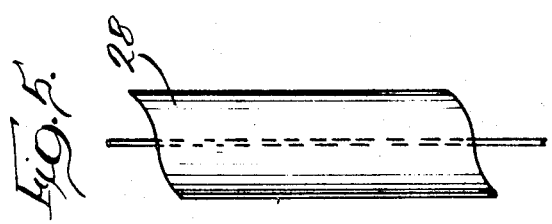

MULTILEVEL AIRPORT STRUCTURE

BACKGROUND OF THE INVENTION

With the advent of congested and built-up metropolitan areas different ways have been considered to design an airport that requires relatively little area but at the same time has the capacity to accommodate increased passenger use of air travel. Such a need was expressed in U.S. Pat. No. 1,843,640 W.H. Jackson et al. entitled "Elevated Airport" whereby the inventors proposed an airfield above a complex of residential buildings. A similar need was expressed in U.S. Pat. No. 3,033,499 by C.S. Ash entitled "Aircraft Handling Residential Building" in which the inventor disclosed an airport on top of a roof of a residential building. Even though the prior art might have contributed towards solving the problem in terms of the shortage of available land, no prior art has devised a means for solving the problem of future expansion and maximum efficiency.

SUMMARY OF THE INVENTION

This invention provides a multilevel aircraft structure for simultaneously handling landings, takeoffs, cargo service and passenger flow within one structure in order to meet the needs of future air travel. The aircraft structure includes an aircraft landing roof, an aircraft service level below the roof, an aircraft takeoff strip below the aircraft service level with elevator facilities for transferring the aircraft vertically between the different levels. Preferably the aircraft structure is situated adjacent to and cooperates with an airport terminal in a manner to ensure passenger handling efficiency; advantageously private and public transportation facilities are provided at a basement level of the structure.

DESCRIPTION OF THE DRAWINGS

FIG. 4 is an enlarged perspctve view of an elevator such as used in the structure of FIG. 1.

FIG. 5 is a view of a wind deflector as shown in FIG. 2.

DETAILED DESCRIPTION OF THE DRAWINGS

Figure 1:
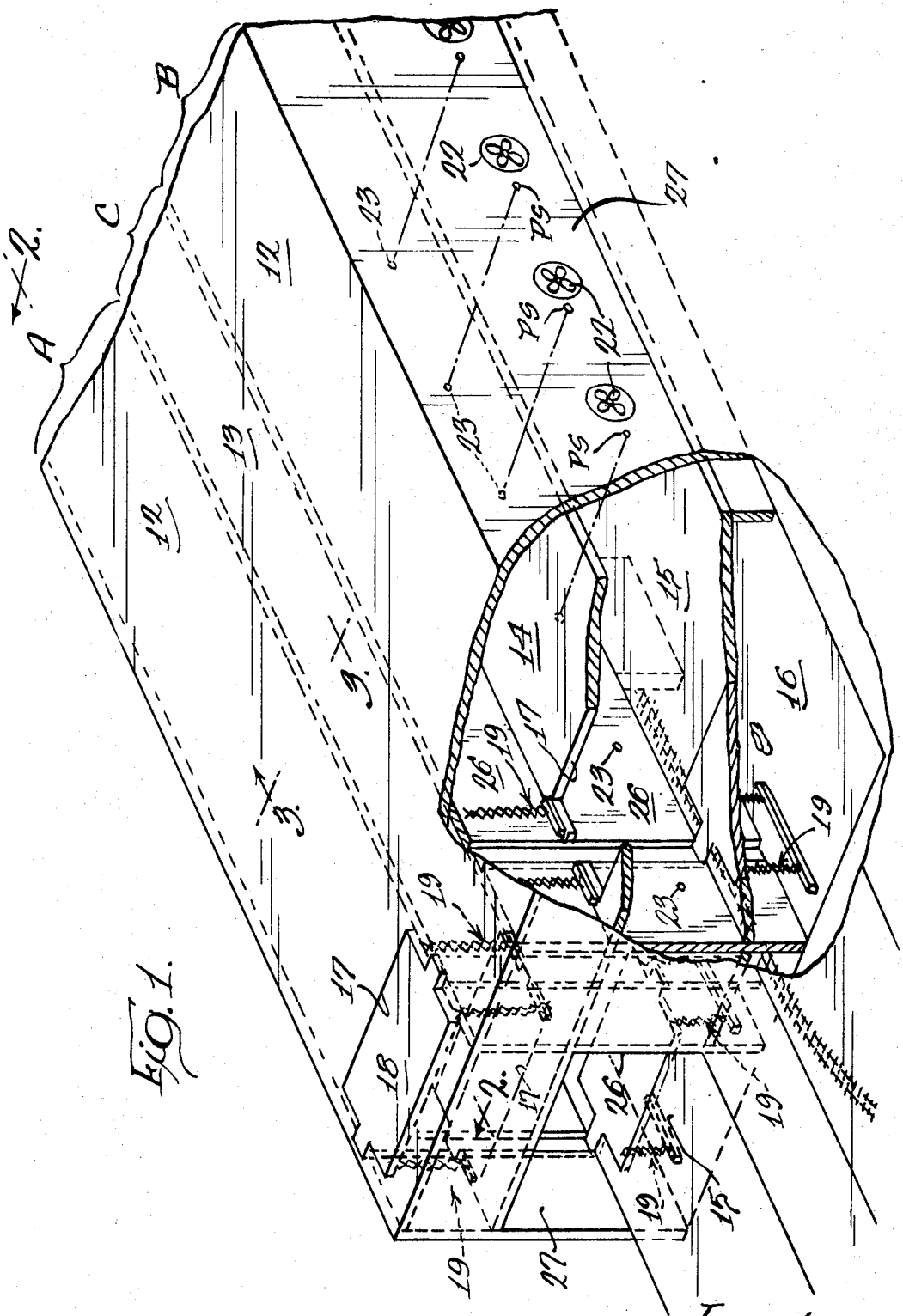
FIG. 1 is a fragmentary perspective view partially cut away of an airport structure embodying the invention.

Referring to the drawings in greater detail, the preferred embodiment of the invention is illustrated in FIG. 1 as a complete airport. This embodiment includes two elongated aircraft structures A and B surrounding an elongated terminal C. The aircraft structures A and B are similar to each other, e.g., mirror images in the illustrated form. One end of the aircraft structure B is cut away to show the various levels.

A roof 12 is provided on each of the aircraft structures A and B for aircraft landing and, if desired, can be provided with landing speed arresters such as are used on aircraft carriers or the S.A.T.S. systems for slowing or stopping landing aircraft. The roof 13 of the terminal C may be employed for landing and takeoff of small planes, helicopters, and other small aircraft used to transport passengers, baggage, and mail to and from the terminal.

An intermediate or aircraft service level 14 is provided beneath roof 12 for aircraft servicing, passenger movement on and off the aircraft, and cargo loading.

A ground or takeoff level or strip 15 is provided beneath level 14 of a proper size for accommodating aircraft takeoffs. The runway of the takeoff strip extends beyond the structure upon the ground at each end for additional takeoff space, if needed, and for braking room on abortive takeoffs. These extending portions of strip 15 will usually be about as long as full length runways and are preferably provided with wind deflectors as shown at 28 (FIGS. 2 and 5) for a considerable distance from the end of the building. The sides of the building, if left open, can also be lined with wind deflectors along levels 14 and 15, as can roof 12 as seen in FIG. 1. The deflectors are pivotally adjustable for changing their facing direction to accommodate changes in wind direction and can be secured against pivotal movement once adjusted.

Along its extent within the buildings the takeoff strip 15 is equipped with antipollution devices in the form of reversible intake and exhaust fans 22 mounted through outside walls 27. Each of these fans 22 is controlled by an adjacent photocell mounted in the outside wall 27, receiving a beam of light from a light source 23 mounted on the inside wall 26. When the light beams are broken seriatim down the takeoff level 15 by an aircraft during takeoff the fans reverse themselves also seriatim down the takeoff strip 15 from intake to exhaust. In this manner, the fans supply outside air to level 15 in front of an aircraft motor and carry away exhaust fumes behind the motor as the aircraft taxies and takes off.

Aircraft are transported vertically between the roof 12, the aircraft service level 14, and the takeoff level 15 by elevator means. The elevator means includes two elevators at each end of each level 14, one for lowering aircraft from roof 12 to level 14 and the other for lowering aircraft from level 14 to strip 15. Said elevator means will be described in greater detail below, but as shown generally in FIG. 1, each elevator includes an elevator platform 18 which is driven upwardly and downwardly by a system 19 of hydraulic cylinders. Platform 18 includes a pair of protruding flanges 18a which ride in vertical grooves in inside walls 26 and in outside walls 27 for guiding and stabilizing the platform during movement. Openings 17 on the roof 12, the aircraft service level 14, and level or strip 15 are provided to accommodate the elevator platform 18 at these various levels.

It should be noted that the elevator platform is supported by a system 19 of hydraulic cylinders along each side. The platform of the top elevator which moves between levels 12 and 14 is wider than the lower elevator platform and has its hydraulic system 19 spaced further apart than the width of the lower platform.

Figure 2:
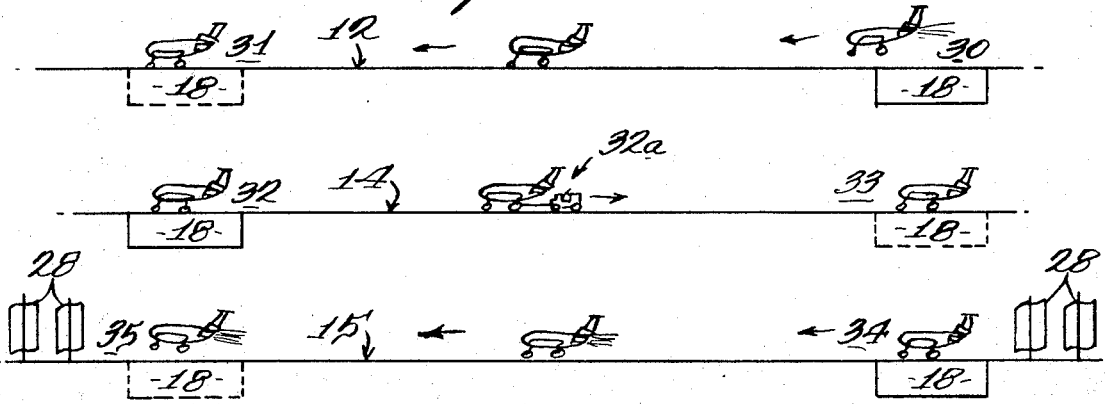
FIG. 2 is a schematic aircraft flow diagram section taken generally through the line 2–2 of FIG. 1.

FIG. 2 shows a schematical diagram showing the aircraft flow to, from and within the aircraft structure A or B. The diagram includes the roof 12, the intermediate aircraft service level 14, the takeoff level 15, and the elevator platforms 18. Numbers 30 through 35 are points of reference on the various levels.

An aircraft lands at point 30 on roof 12, comes to a stop at point 31 and the elevator 18 lowers the aircraft to point 32 on level 14. The aircraft is transported between 32 and 33 on level 14 by suitable transportation means such as a tractor, e.g., at 32a or conveyor belt (not shown). Various servicing or loading stations are provided between 32 and 33 where the aircraft is stopped to be unloaded, cleaned, checked, refueled, and/or loaded to prepare for takeoff. The aircraft is then lowered by the elevator 18 from point 33 to point 34 on the takeoff level 15. The aircraft then taxies and accelerates for lift-off, e.g., at point 35. A launch device (not shown) can be provided before point 35 to facilitate lift-off.

The procedure outlined in the above paragraph can be reversed. That is, the aircraft can land at 31, stop 30, lower to 33, be transported to 32, and then lower to 35 for takeoff at 34.

Figure 3:
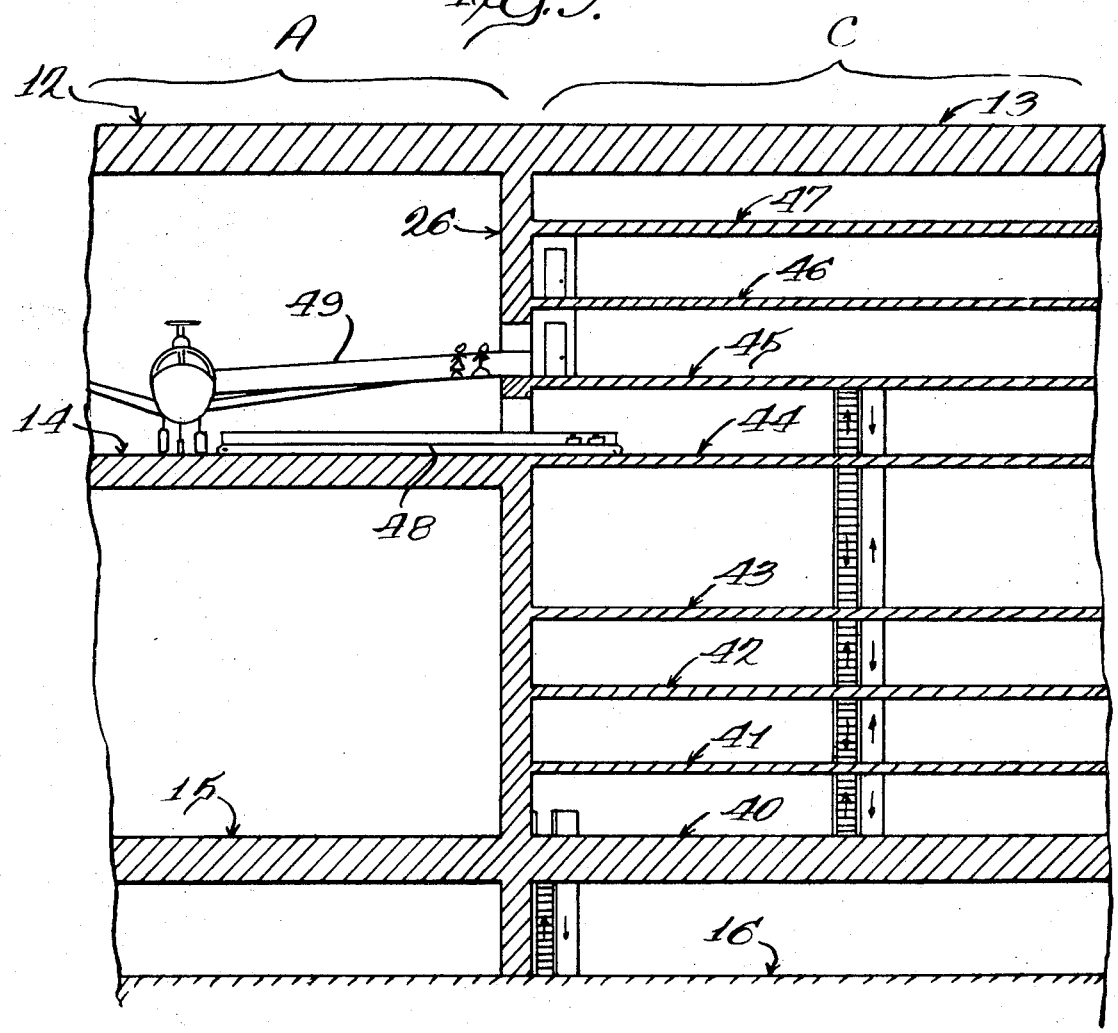
FIG. 3 is a fragmentary section on an enlarged scale taken generally through the line 3–3 of FIG. 1.

FIG. 3 shows the relative locations of the various levels of the terminal C and the interconnection of the terminal with the aircraft structure A. Numbers 40 through 47 indicate the different levels of the terminal C.

Level 40 is a "concourse" which is at ground level. The concourse provides space for ticket offices or automatic vending machines and space for processing international passengers and all other equipment found in an airport terminal. The concourse is preferably located as near the center of the terminal as possible to facilitate parking in the outlying areas underground 16.

Levels 41, 42 and 43 can be used for shops, restaurants and other services.

Level 44 is a "redirect" area from which baggage and other cargo is delivered to, or received from, an aircraft on the aircraft service level 14. For this purpose there is provided a conveyor belt 48 cooperating between the redirect area 44 and the aircraft on the aircraft service level 14.

Level 45 is the passenger arrival and departure level from which the passengers board and depart through passenger movement means 49 between the arrival and departure area and the aircraft service level 14.

Level 46 can be used for warehouses. Portions of level 40 can be used as hangar areas for aircraft making major repairs; aircraft can be moved from the takeoff level 15 to 40 by tractor. Also, the balance of the horizontal area between levels 40 and 46 can be used as warehouses for the airlines or for additional parking.

Level 47 of the terminal C houses the air control tower T, containing the usual air control equipment and personnel.

A basement level 16 (FIG. 1) is provided beneath the terminal C and/or the takeoff level 15 to accommodate public and private transportation.

Enough elevators, escalators or speed ramps are provided in terminal C to adequately accommodate all passengers, mail, baggage, and as much freight as is normally carried on regular flights from underground 16 to the concourse 40. Also sufficient equipment to move this traffic to the upper levels is provided.

FIG. 4 shows the aircraft elevator in more detail. Each elevator comprises footings in the form of beams 50 secured to level 15 or 16 (FIG. 1) for supporting hydraulic systems 19. Each system 19 includes a plurality of movable support structures 52, each including an accordionlike arrangement of crossbars 54 pivotally connected at their ends 54a and midpoints 54b. Each pair of end-connected arms 54 is provided with a hydraulic cylinder 53, pivotally attached at its ends to the respective arms. The cylinders 53 operate to pivot the members 54 relative to each other about points 54a for raising and lowering the platform 18. For example, the hydraulic cylinders 53 are supplied with fluid under pressure by means of flexible tubing (not shown) to raise platform 18 until it is at the proper level and are bled to lower platform 18 to a lower level.

While I have shown and described what I believe to be the best embodiment of my invention, it will be apparent to those skilled in the art that many changes and modifications may be made in the specific embodiment disclosed, all within the spirit and scope of the invention as defined in the appended claims.

I claim:

1. An aircraft handling facility providing aircraft landing and takeoff runway strip means including a multilevel aircraft building structure having separate aircraft landing and takeoff runway strips and passenger and cargo movement facilities as a single building comprising:
    a plurality of stacked horizontal levels including a first level of said structure defining an unobstructed substantially flat stationary landing strip as the roof of said structure;
    a second level directly underlying the first level defining an aircraft service floor and having aircraft transport means for moving an aircraft on the second level, aircraft service facilities and means for loading cargo on an aircraft;
    a third level directly underlying the second level defining an unobstructed substantially flat stationary takeoff runway strip and being open to the outside at one end of the structure for exit of aircraft therefrom; and aircraft elevator means for moving an aircraft upward and downward between all three of said levels.

2. The structure of claim 1 including as an additional portion of the strip means an unobstructed substantially flat stationary extension strip integral with said third level, said extension strip extending at least about 150 feet beyond said building structure.

3. The structure of claim 2 including a plurality of individual spaced apart wind deflectors along a portion of the strip means.

4. The structure of claim 3 wherein said deflectors are along both sides of the extension strip.

5. The aircraft structure in claim 1 including an airport terminal having one of its sides adjacent to said aircraft structure, said airport terminal having a plurality of horizontal levels with passenger movement means associated with said aircraft structure and the different levels of said airport terminal for moving passengers between said aircraft structure and said airport terminal.

6. The structure in claim 5 including a public and private transportation level below said structure with facilities to accommodate public and private transportation.

7. The structure defined in claim 5 including a second multilevel aircraft structure adjacent to another side of said airport terminal, said second aircraft structure having passenger movement means associated with said airport terminal for moving passengers between said second aircraft structure and said airport terminal.

8. The structure of claim 1 wherein said takeoff level includes antipollution devices.

9. The structure of claim 8 wherein said antipollution devices include reversible fans triggered by photoelectric means.

10. The structure in claim 1 wherein said structure defines an elongated building structure.

11. The structure of claim 1 wherein said aircraft transport means includes conveyor means.

12. The structure of claim 1 wherein said aircraft elevator means includes elevator openings and an aircraft elevator mounted in said elevator said aircraft elevator including a vertically movable elevator platform and means for moving said platform.

13. A method of handling aircraft in a multilevel elongated aircraft structure having a plurality of stacked horizontal levels comprising:
    landing the aircraft on a first level of said structure in a first direction;
    transferring the landed aircraft downwardly to a lower second level of said structure;
    transporting the aircraft in a backward manner in a second direction opposite of that of the first direction on the second level of said structure to servicing and loading stations;
    servicing and loading the aircraft at the servicing and loading stations;
    transferring the serviced and loaded aircraft downwardly to a still lower third level of said structure; and
    propelling said aircraft on the third level of said structure in the first direction at an increasing rate of speed until the aircraft becomes airborne.